United States Patent
Xue et al.

(10) Patent No.: US 6,278,592 B1
(45) Date of Patent: Aug. 21, 2001

(54) GMR SPIN VALVE HAVING A BILAYER TAN/NIFECR SEEDLAYER TO IMPROVE GMR RESPONSE AND EXCHANGE PINNING FIELD

(75) Inventors: Song S. Xue, Eden Prairie; Qing I. He, Bloomington; Hong Wang, Savage; Kristin J. Duxstad, Eden Prairie; Michael B. Hintz, Mahtomedi, all of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/420,934

(22) Filed: Oct. 19, 1999

Related U.S. Application Data
(60) Provisional application No. 60/149,509, filed on Aug. 17, 1999.

(51) Int. Cl.[7] ........................................ G11B 5/39
(52) U.S. Cl. .................... 360/324.12; 360/324.11
(58) Field of Search ............................. 360/324, 324.1, 360/324.11, 324.12

(56) References Cited

U.S. PATENT DOCUMENTS

| | | | |
|---|---|---|---|
| 5,574,605 | * 11/1996 | Baumgart et al. | 360/324.11 |
| 5,637,235 | * 6/1997 | Kim et al. | 216/22 |
| 5,648,885 | 7/1997 | Nishioka et al. | 360/324.12 |
| 5,667,879 | * 9/1997 | Haji-Sheikh | 428/209 |
| 5,731,936 | * 3/1998 | Lee et al. | 360/327.22 |
| 5,742,459 | * 4/1998 | Shen et al. | 360/327.32 |
| 5,796,560 | * 8/1998 | Saito et al. | 360/324 |
| 5,850,323 | 12/1998 | Kanai | 360/324.11 |
| 5,896,252 | 4/1999 | Kanai | 360/324.12 |
| 5,898,549 | 4/1999 | Gill | 360/324.11 |
| 6,046,892 | * 4/2000 | Aoshima et al. | 360/324.11 |

OTHER PUBLICATIONS

"Giant Magnetoresistance in Spin–Valve Multilayers" by B. Dieny, *Journal of Magnetism and Magnetic Materials*, vol. 136, No. 3, Sep., 1994.

\* cited by examiner

*Primary Examiner*—David L. Ometz
(74) *Attorney, Agent, or Firm*—Kinney & Lange, P.A.

(57) ABSTRACT

A giant magnetoresistive spin valve read sensor includes a bilayer seed layer and a stack of films. The bilayer seed layer includes a TaN seed layer and a NiFeCr seed layer. The stack of films includes a free layer adjacent the NiFeCr seed layer, a pinning layer, a pinned layer positioned between the free layer and the pinning layer, and a spacer layer positioned between the free layer and the pinned layer. The bilayer seed layer is used to promote the texture and grain growth of each of the layers subsequently grown upon the seed layer. The free layer has a rotatable magnetic moment, while the pinned layer has a fixed magnetic moment. The resistance of the giant magnetoresistive spin valve read sensor varies as a function of an angle formed between the magnetization of the free layer and the magnetization of the pinned layer.

20 Claims, 9 Drawing Sheets

GMR SPIN VALVE HAVING A BILAYER TAN/NIFECR SEEDLAYER TO IMPROVE GMR RESPONSE AND EXCHANGE PINNING FIELD

CROSS-REFERENCE TO RELATED APPLICATION

This Application claims the priority benefit of Provisional U.S. Patent Application Serial No. 60/149,509 entitled "STRUCTURES TO ENHANCE THE GMR RESPONSES AND IMPROVE EXCHANGE PINNING FIELD BY USING A BILAYER TaN (OR Ta)/NiFeCr AS THE SEEDLAYER IN A SPIN VALVE SENSOR," filed Aug. 17, 1999.

BACKGROUND OF THE INVENTION

The present invention relates generally to a giant magnetoresistive read sensor for use in a magnetic read head. In particular, the present invention relates to a giant magnetoresistive read sensor having an enhanced giant magnetoresistive response and an increased exchange pinning field strength.

Giant magnetoresistive (GMR) read sensors are used in magnetic data storage and retrieval systems to detect magnetically-encoded information stored on a magnetic data storage medium such as a magnetic disc. A time-dependent magnetic field from a magnetic medium directly modulates the resistivity of the GMR read sensor. A change in resistance of the GMR read sensor can be detected by passing a sense current through the GMR read sensor and measuring the voltage across the GMR read sensor. The resulting signal can be used to recover encoded information from the magnetic medium.

A typical GMR read sensor configuration is the GMR spin valve, in which the GMR read sensor is a multi-layered structure formed of a nonmagnetic spacer layer positioned between a ferromagnetic pinned layer and a ferromagnetic free layer. The magnetization of the pinned layer is fixed in a predetermined direction, typically normal to an air bearing surface of the GMR spin valve, while the magnetization of the free layer rotates freely in response to an external magnetic field. The resistance of the GMR spin valve varies as a function of an angle formed between the magnetization direction of the free layer and the magnetization direction of the pinned layer. This multi-layered spin valve configuration allows for a more pronounced magnetoresistive effect, i.e. greater sensitivity and higher total change in resistance, than is possible with anisotropic magnetoresistive (AMR) read sensors, which generally consist of a single ferromagnetic layer.

A pinning layer is typically exchange coupled to the pinned layer to fix the magnetization of the pinned layer in a predetermined direction. The pinning layer is typically formed of an antiferromagnetic material. In antiferromagnetic materials, the magnetic moments of adjacent atoms point in opposite directions and, thus, there is no net magnetic moment in the material.

A seed layer is typically used to promote the texture and enhance the grain growth of each of the layers consequently grown on top of it. The seed layer material is chosen such that its atomic structure, or arrangement, corresponds with the preferred crystallographic and magnetic orientations of the GMR spin valve. The seed layer is typically formed of nonmagnetic materials such as tantalum (Ta) or zirconium (Zr).

The overall response of a GMR spin valve, or its magnetoresistive effect, directly depends upon the GMR ratio (the maximum absolute change in resistance of the GMR spin valve divided by the resistance of the GMR spin valve multiplied by 100%) of the spin valve. The overall response of the GMR spin valve also depends upon strength of the exchange pinning field that exists between the pinning layer and the pinned layer. By increasing both the GMR ratio and the strength of the exchange pinning field between the pinning and pinned layers, the GMR spin valve will be capable of an increased read sensitivity and stability, thereby allowing for use in storage mediums with greater storage densities.

Achievement of the preferred crystallographic and magnetic orientations of each of the layers in the GMR spin valve increases both the GMR ratio and the strength of the exchange pinning field between the pinned and pinning layers. Accordingly, there is a need for a seed layer material that enhances the GMR response by promoting the preferred crystallographic and magnetic orientations of each of the layers in the GMR spin valve.

BRIEF SUMMARY OF THE INVENTION

The present invention is a giant magnetoresistive spin valve read sensor having a bilayer seed layer and a stack of films. The bilayer seed layer includes a TaN seed layer and a NiFeCr seed layer. The stack of films includes a free layer adjacent the NiFeCr seed layer, a pinning layer, a pinned layer positioned between the free layer and the pinning layer, and a spacer layer positioned between the free layer and the pinned layer. The bilayer seed layer is used to promote the texture and grain growth of each of the layers subsequently grown upon the bilayer seed layer. The free layer has a rotatable magnetic moment, while the pinned layer has a fixed magnetic moment. The resistance of the giant magnetoresistive spin valve read sensor varies as a function of an angle formed between the magnetization of the free layer and the magnetization of the pinned layer. In a preferred embodiment of the present invention, the atomic percentage of nitrogen in the TaN seed layer is in a range of about 30 to about 70, and the atomic percentage of chromium in the NiFeCr seed layer is in a range of about 30 to about 50.

In a preferred embodiment of the present invention, both the free layer and the pinned layer are formed of a ferromagnetic material, such as NiFe or CoFe; the spacer layer is formed of a nonmagnetic material, such as copper, gold, or silver; and the pinning layer is formed of an antiferromagnetic material, such as NiMn, NiMnCr, PtMn, PtPdMn, CrMnPt, CrMnCu, CrMnPd, or PtRuMn. In alternate embodiments, either one or both of the free layer and the pinned layer may be formed of a NiFe, a CoFe, or NiFe/CoFe bilayer. Additionally in alternative embodiments, the pinned layer may be a CoFe/Ru/CoFe synthetic antiferromagnet.

DETAILED DESCRIPTION

Figure 1:
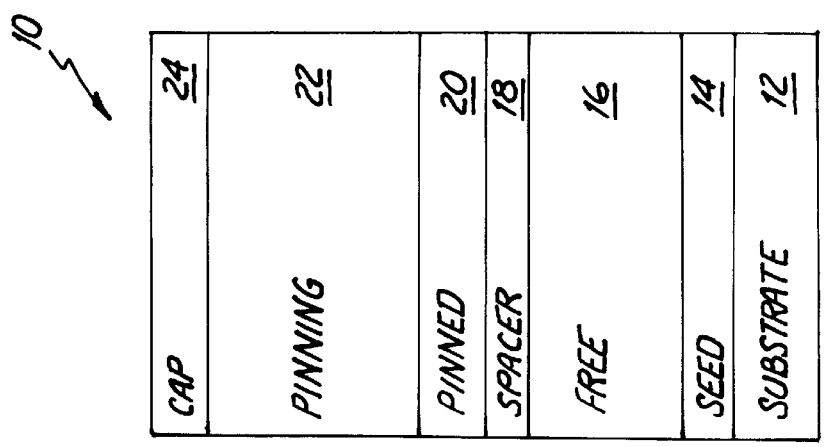
FIG. 1 is a layer diagram of a basic giant magnetoresistive (GMR) spin valve.

FIG. 1 is a layer diagram of giant magnetoresistive (GMR) spin valve 10. GMR spin valve 10 includes substrate 12, seed layer 14 deposited upon substrate 12, free layer 16 deposited upon seed layer 14, spacer layer 18 deposited upon free layer 16, pinned layer 20 deposited upon spacer layer 18, pinning layer 22 deposited upon pinned layer 20, and cap layer 24 deposited upon pinning layer 22. As is known to those skilled in the art, GMR spin valve 10 may include additional layers to those shown in FIG. 1.

Seed layer 14 is used to promote the texture and grain growth of each of the layers subsequently grown upon it. Seed layer 14 is typically formed of a nonmagnetic material having an atomic structure which will promote the desired crystallographic texture of the subsequent layers, such as tantalum (Ta), zirconium (Zr), or titanium (Ti). A thickness of seed layer 14 is typically in the range of about 10 Å to about 200 Å.

Free layer 16 and pinned layer 20 are each formed of ferromagnetic materials such as NiFe or cobalt-iron (CoFe). Each of free layer 16 and pinned layer 20 may also be formed of multiple layers. Commonly, a bilayer consisting of a NiFe layer and a CoFe layer are used in place of one or both of free layer 16 and pinned layer 20. A magnetization of pinned layer 20 is fixed in a predetermined direction, while a magnetization of free layer 16 rotates freely in response to external magnetic fields. The resistance of GMR spin valve 10 varies as a function of an angle formed between the magnetization of free layer 16 and the magnetization of pinned layer 20. A thickness of free layer 16 is typically in the range of about 10 Å to about 500 Å, while a thickness of pinned layer 20 is typically in the range of about 10 Å to about 100 Å.

Spacer layer 18 is formed of a nonmagnetic material such as copper (Cu), or a copper alloy. A thickness of spacer layer 18 is typically in the range of about 20 Å to about 35 Å.

Pinning layer 22, which is exchange-coupled to pinned layer 20 to fix the magnetization of pinned layer 20 in the predetermined direction, is formed of an antiferromagnetic material such as nickel-manganese (NiMn), nickel-manganese-chromium (NiMnCr), platinum-manganese (PtMn), paladium-platinum-manganese (PdPtMn), chromium-manganese-platinum (CrMnPt), chromium-manganese-copper (CrMnCu), chromium-manganese-paladium (CrMnPd), or platinum-ruthenium-manganese (PtRuMn). Pinning layer 22 is preferably formed of a material having a relatively high blocking temperature, which is the temperature at which exchange coupling between pinning layer 22 and pinned layer 20 disappears, and a relatively low annealing temperature, which is the temperature at which pinning layer 22 and pinned layer 20 are exchanged coupled during manufacture of GMR spin valve 10. A high blocking temperature will enable better control of the magnetic properties of GMR spin valve 10, and a low anneal temperature will minimize diffusion between layers of GMR spin valve 10. A thickness of pinning layer 22 is typically in the range of about 100 Å to about 300 Å.

Figures 2A, 2B:
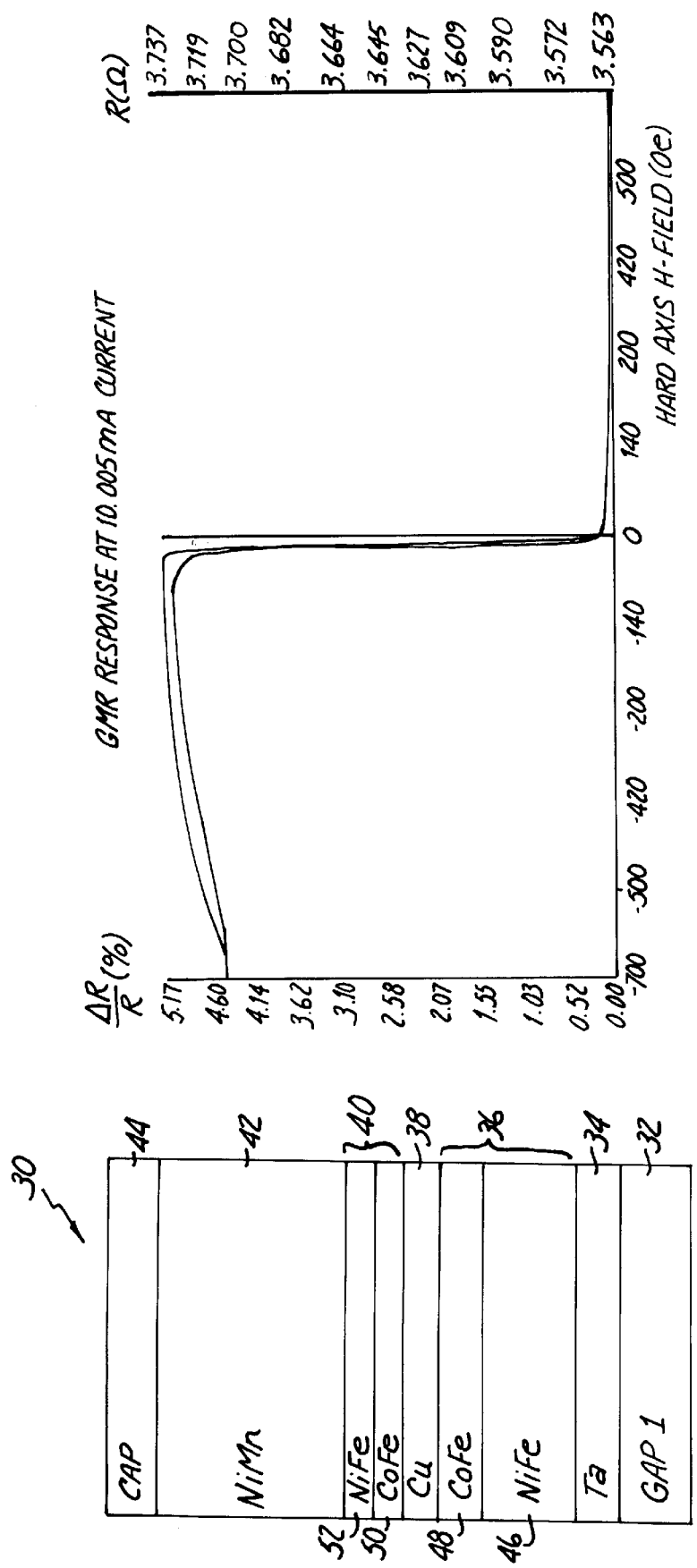
FIG. 2A is a layer diagram of a prior art GMR spin valve having a tantalum seed layer.
FIG. 2B is a graph of the GMR response of the GMR spin valve of FIG. 2A.
Figures 3A, 3B:
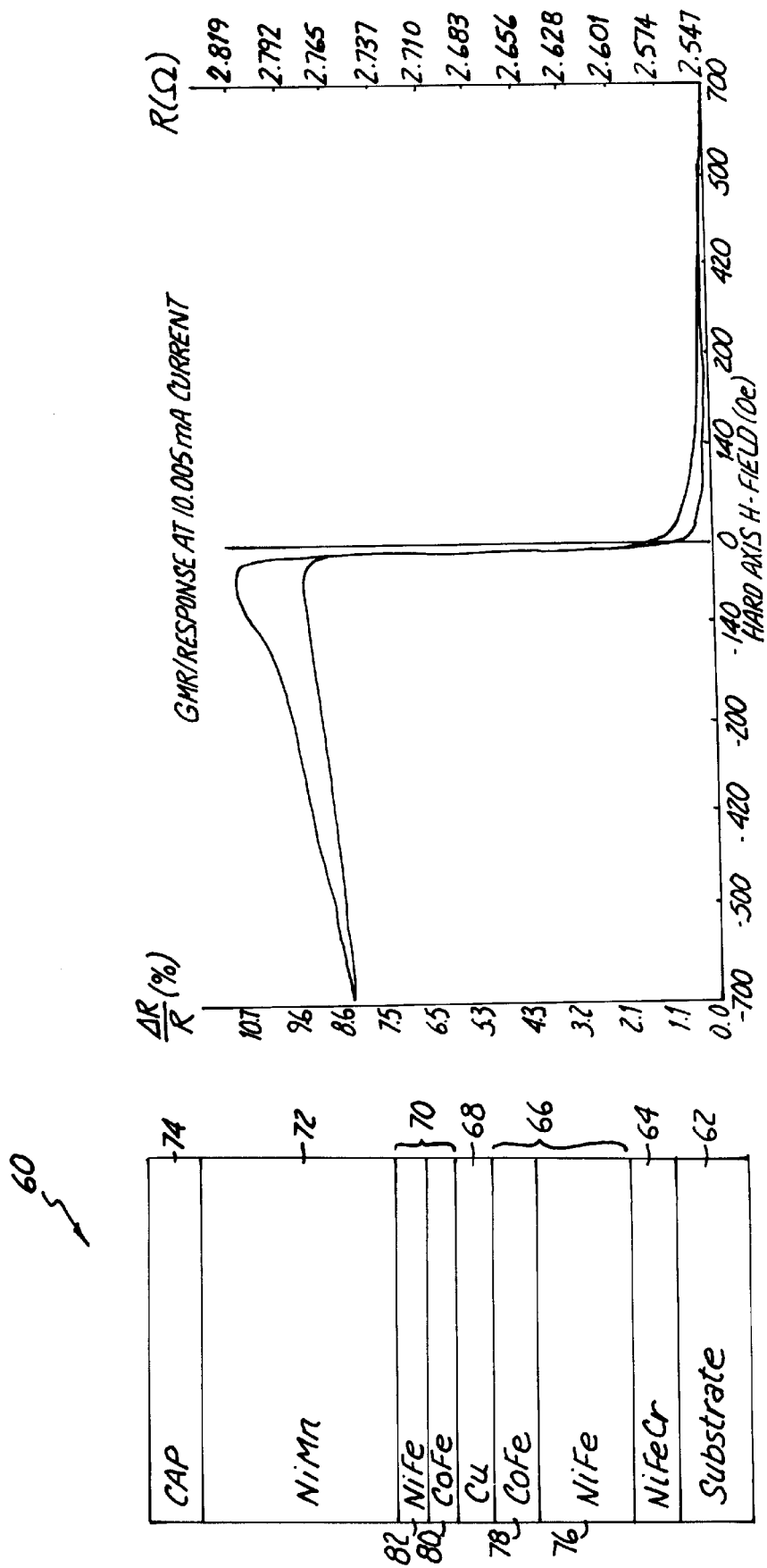
FIG. 3A is a layer diagram of a prior art GMR spin valve having a NiFeCr seed layer.
FIG. 3B is a graph of the GMR response of the GMR spin valve of FIG. 3A.
Figures 4A, 4B:
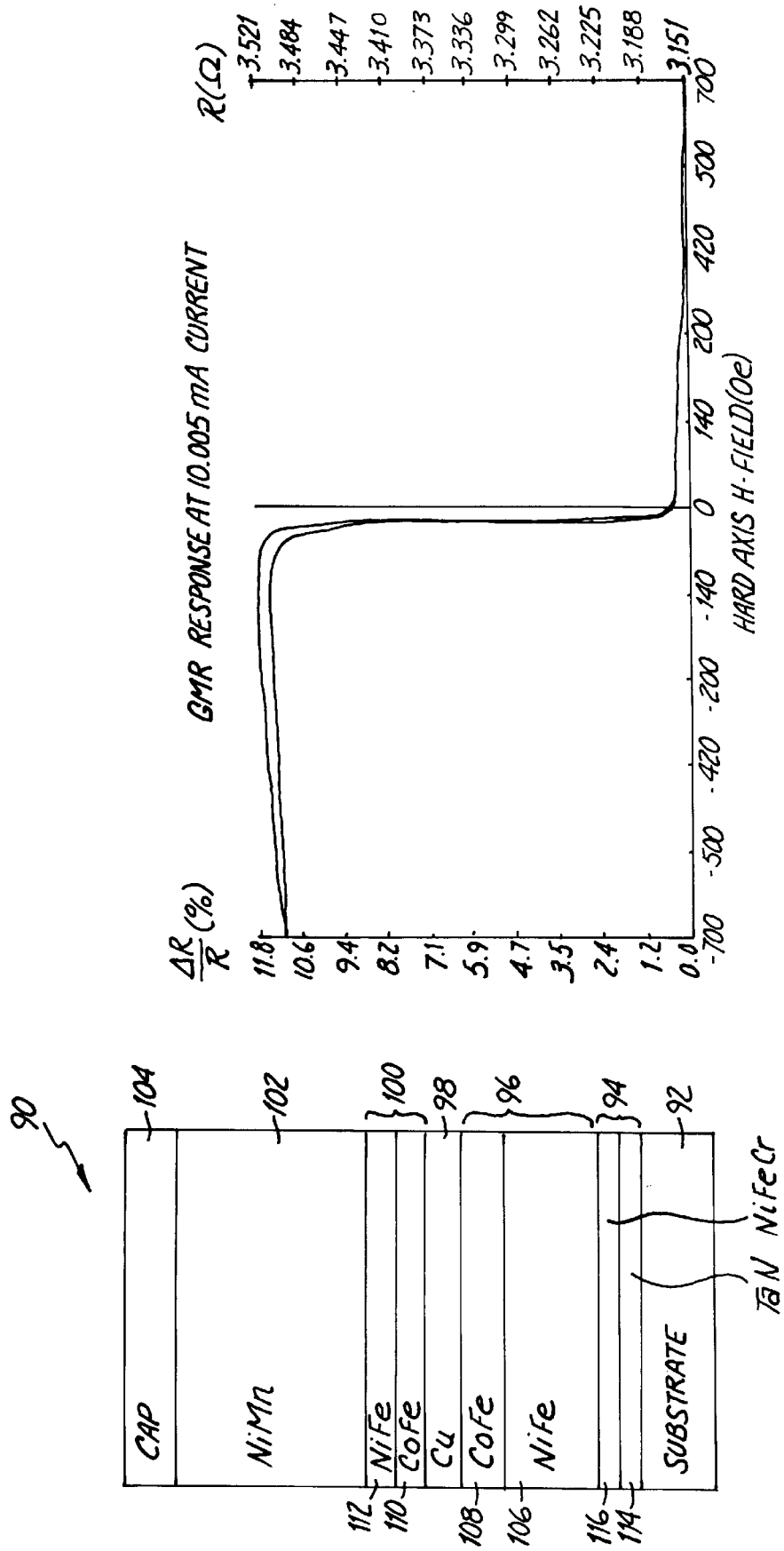
FIG. 4A is a layer diagram of a GMR spin valve having a TaN/NiFeCr bilayer seed layer in accord with the present invention.
FIG. 4B is a graph of the GMR response of the GMR spin valve of FIG. 4A.

FIGS. 2A, 3A, and 4A are each layer diagrams of respective GMR spin valves 30, 60, and 90. GMR spin valve 30 includes substrate 32, seed layer 34 deposited upon substrate 32, free layer 36 deposited upon seed layer 34, spacer layer 38 deposited upon free layer 36, pinned layer 40 deposited upon spacer layer 38, pinning layer 42 deposited upon pinned layer 40, and cap layer 44 deposited upon pinning layer 42. GMR spin valve 60 includes substrate 62, seed layer 64 deposited upon substrate 62, free layer 66 deposited upon seed layer 64, spacer layer 68 deposited upon free layer 66, pinned layer 70 deposited upon spacer layer 68, pinning layer 72 deposited upon pinned layer 70, and cap layer 74 deposited upon pinning layer 72. GMR spin valve 90 includes substrate 92, seed layer 94 deposited upon substrate 92, free layer 96 deposited upon seed layer 94, spacer layer 98 deposited upon free layer 96, pinned layer 100 deposited upon spacer layer 98, pinning layer 102 deposited upon pinned layer 100, and cap layer 104 deposited upon pinning layer 102.

Except for seed layers 34, 64, and 94, each of the layers of spin valves 30, 60, and 90 are substantially identical to corresponding layers in each of the other of spin valves 30, 60, or 90. Spin valves 30 and 60 are both prior art spin valves as seed layer 34 of spin valve 30 is formed of Ta and seed layer 64 of spin valve 60 is formed of NiFeCr. Spin valve 90 is a spin valve of the present invention, as seed layer 94 is formed of a TaN/NiFeCr bilayer. Bilayer seed layer 94 has a first seed layer 114 and a second seed layer 116. First seed layer 114 is formed of tantalum-nitride (TaN) and positioned adjacent substrate 92. Second seed layer 116 is formed of nickel-iron-chrome (NiFeCr) and is positioned adjacent free layer 96. In a preferred embodiment of bilayer seed layer 94, the atomic percentage of nitrogen in TaN first seed layer 114 is in the range of about 30 to about 70, and the atomic percentage of chromium in the NiFeCr second seed layer 116 is in the range of about 30 to about 50.

Spacer layers 38, 68, and 98 are each formed of copper. Free layers 36, 66, and 96 are each formed of bilayers having respective first free layers 46, 76, and 106 formed of NiFe and respective second free layers 48, 78, and 108 formed of CoFe. First free layers 46, 76, and 106 are adjacent corresponding seed layers 34, 64, and 94. Second free layers 48, 78, and 108 are adjacent corresponding spacer layers 38, 68, and 98. Pinned layers 40, 70, and 100 are each formed of bilayers having respective first pinned layers 50, 80, and 110 formed of CoFe and respective second pinned layers 52, 82, and 112 formed of NiFe. First pinned layers 50, 80, and 110 are adjacent corresponding spacer layers 38, 68, and 98. Second pinned layers 52, 82, and 112 are adjacent corresponding pinning layers 42, 72, and 102. Pinning layers 42, 72, and 102 are each formed of NiMn.

FIGS. 2B, 3B, and 4B are each graphs illustrating the GMR response of respective GMR spin valves 30, 60, and 90. FIGS. 2B, 3B, and 4B plot the GMMR ratio of respective spin valves 30, 60, and 90 as a function of an applied magnetic field along hard-axis of corresponding spin valve 30, 60, or 90. The GMR ratio of a GMR spin valve is the maximum absolute change in resistance of the GMR spin valve divided by the resistance of the GMR spin valves multiplied by 100%.

Collectively, FIGS. 2B, 3B, and 4B illustrate the influence of different seed layers 34, 64, and 94 upon the GMR response of respective spin valves 30, 60, and 90.

GMR spin valve 30, which has Ta seed layer 34 and was annealed at about 270° C. for two hours, has a pinning field strength of about 500 Oe. As shown in FIG. 2B, the GMR ratio of GMR spin valve 30 is about 4.6–5.17%.

GMR spin valve 60, which has NiFeCr seed layer 64 and was annealed at about 300° C. for two hours, has a pinning field strength less than the pinning field strength of spin valve 30. As shown in FIG. 3B, the GMR ratio of GMR spin valve 60 is about 8.6–10.7%.

GMR spin valve 90 has bilayer seed layer 94 in accord with the present invention. Bilayer seed layer 94 is formed of first seed layer 114, which is formed of tantalum-nitride (TaN), and second seed layer 116, which is formed of nickel-iron-chromium (NeFeCr). GMR spin valve 90 was annealed at about 300° C. for two hours and has a pinning field strength comparable to the pinning field strength of spin valve 30. As shown in FIG. 4B, the GMR ratio of GMR spin valve 90 is about 11–11.8%.

In comparing prior art GMR spin valves 30 and 60, GMR spin valve 30 with Ta seed layer 34 has a pinning strength greater than GMR spin valve 60 with NiFe seed layer 64, whereas GMR spin valve 60 has a substantially greater GMR response than GMR spin valve 30. GMR spin valve 90 in accord with the present invention has a pinning strength comparable to prior art GMR spin valve 30 and a GMR response comparable to prior art GMR spin valve 60.

GMR spin valve 90 improves upon the prior art because bilayer seed layer 94 better promotes the preferred (111) crystallographic texture of the subsequent layers. This point is illustrated in FIGS. 5A and 5B, in which three multilayered samples having different substrates are compared.

Figures 5A, 5B:
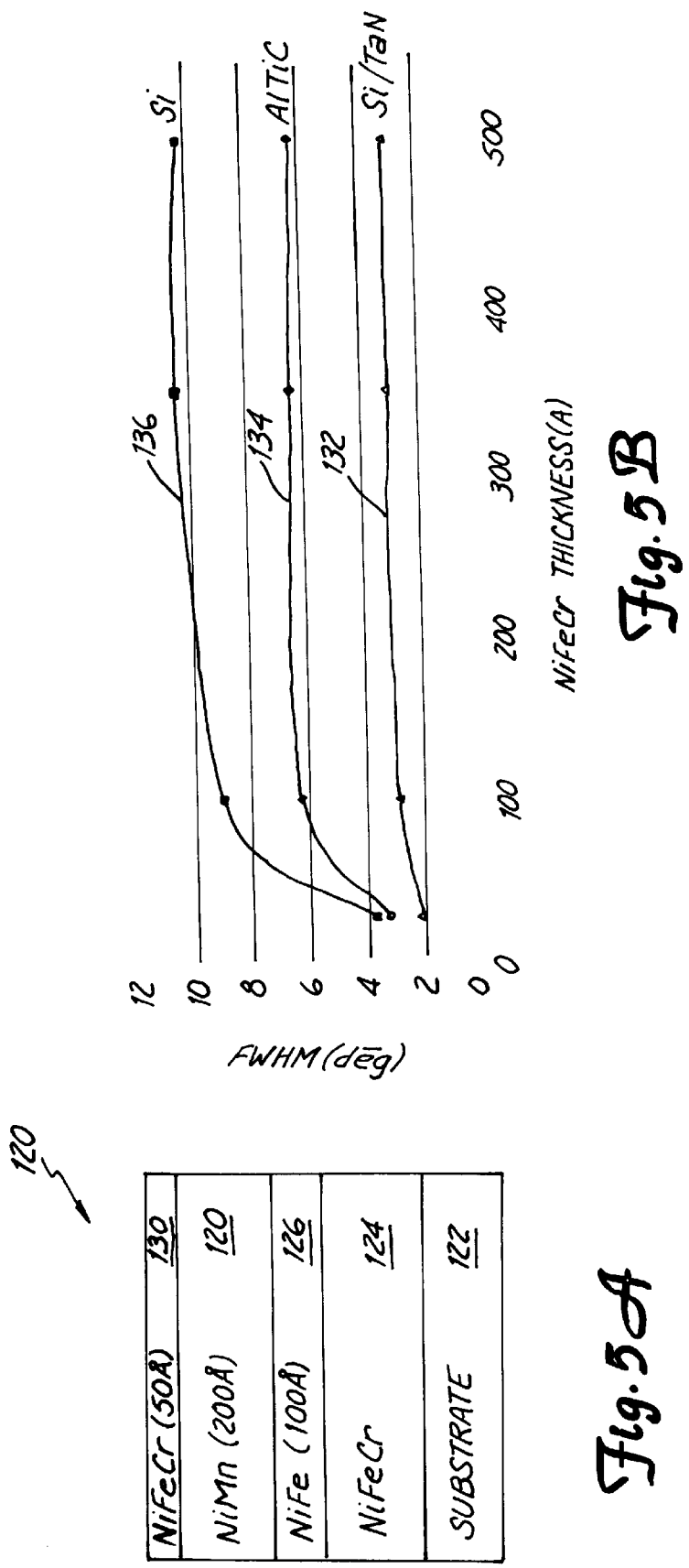
FIG. 5A is a layer diagram of a multilayer sample having a substrate and a first NiFeCr layer.
FIG. 5B is a plot of the Full-Width-At-Half-Maximum (FWHM) for the NiMn (111) texture of the multilayer sample of FIG. 5A as a function of the material forming the substrate and the thickness of the first NiFeCr layer.

FIG. 5A is a layer diagram of multilayer sample 120, which includes substrate 122, first NiFeCr layer 124 deposited upon substrate 122, NiFe layer 126 deposited upon first NiFeCr layer 124, NiMn layer 128 deposited upon NiFe layer 126, and second NiFeCr layer 130 deposited upon NiMn layer 128. FIG. 5B is a plot of the Full-Width-At-Half-Maximum (FWHM) for the NiMn (111) texture of multilayer samples 120 as a function of the material forming substrate 122 and the thickness of first NiFeCr layer 124. The FWHM values are derived from x-ray diffraction rocking curve measurements. The thickness of NiFe layer 126 is about 100 Å; the thickness of NiMn layer 128 is about 200 Å, and the thickness of second NiFeCr layer 130 is about 50 Å.

Curve 132 of FIG. 5B is derived from substrate 122 of multilayered sample 120 being formed of a silicon/silicon-oxide/tantalum-nitride (Si/SiO$_2$/TaN) structure. Curve 134 of FIG. 5B is derived from substrate 122 of multilayered sample 120 being formed of aluminum-titanium-carbon (AlTiC) and aluminum-oxide (Al$_2$O$_3$). Curve 136 of FIG. 5B is derived from substrate 122 of multilayered sample 120 being formed of silicon (Si) and silicon-oxide (SiO$_2$). Curve 132 for the Si/SiO$_2$/TaN substrate 122 has the lowest FWHM, which indicates that the application of the TaN seed layer improves the texture of sample 120.

Figure 6:
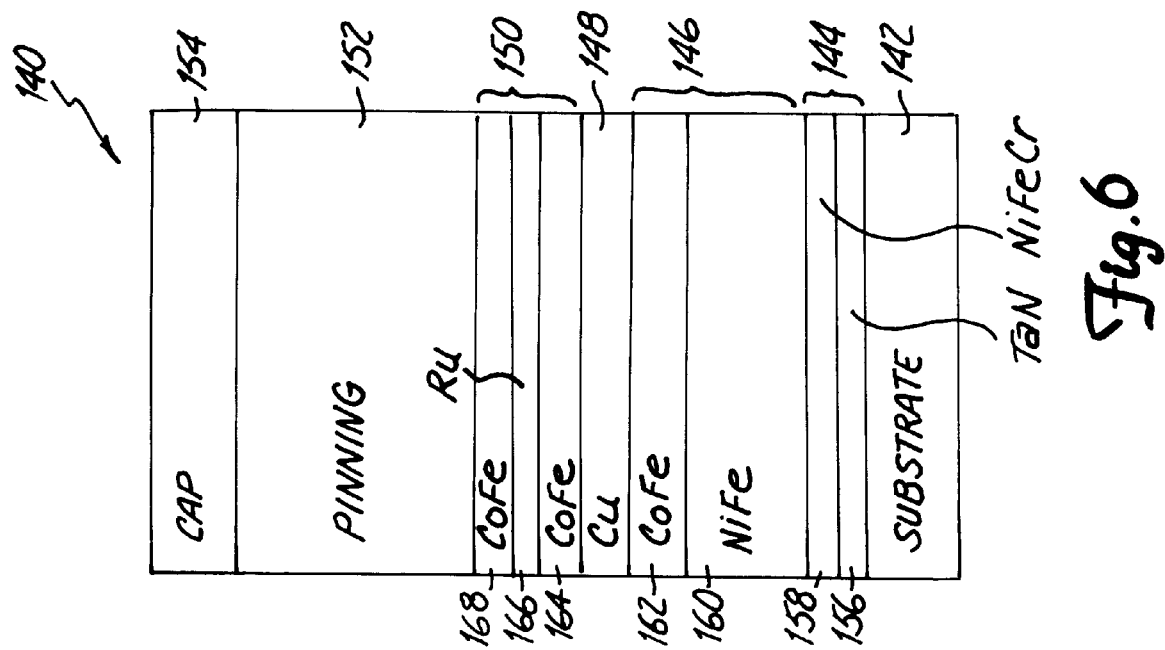
FIG. 6 is a layer diagram of a GMR spin valve in accord with the present invention and having a synthetic antiferromagnet as a pinned layer.

FIG. 6 is a layer diagram of GMR spin valve 140 in accord with the present invention and having a synthetic antiferromagnet. GMR spin valve 140 includes substrate 142, seed layer 144 deposited upon substrate 142, free layer 146 deposited upon seed layer 144, spacer layer 148 deposited upon free layer 146, pinned layer 150 deposited upon spacer layer 148, pinning layer 152 deposited upon pinned layer 150, and cap layer 154 deposited upon pinning layer 152.

Seed layer 144 is formed of a bilayer having first seed layer 156 adjacent substrate 142 and formed of TaN and second seed layer 158 adjacent free layer 146 and formed of NiFeCr. Free layer 146 is formed of a bilayer having first free layer 160 and second free layer 162. First free layer 160 is positioned adjacent seed layer 144 and is preferably formed of NiFe. Second free layer 162 is positioned adjacent spacer layer 148 and is preferably formed of CoFe. Spacer layer 148 is formed of copper. Pinned layer 150 is a synthetic antiferromagnet having first and second pinned layers 164 and 168, both preferably formed of CoFe, and coupling layer 166, preferably formed of ruthenium (Ru), positioned between first and second pinned layers 164 and 168. Pinning layer 152 is formed of an antiferromagnetic material such as NiMn, NiMnCr, PtMn, PtPdMn, CrMnPt, CrMnCu, CrMnPd, or PtRuMn.

Figure 7:
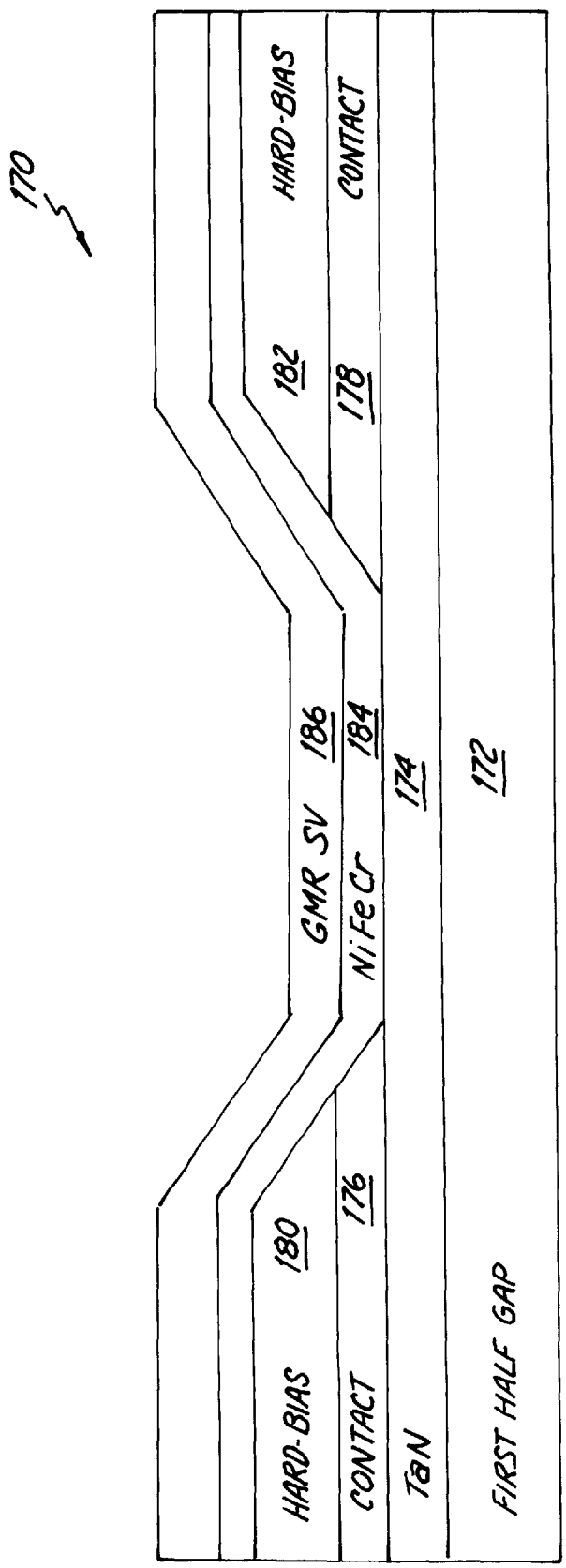
FIG. 7 is a layer diagram of a GMR read sensor in accord with the present invention and having an overlaid structure.

FIG. 7 is a layer diagram of GMR read sensor 170 in accord with the present invention and having an overlaid structure. GMR read sensor 170 includes first half gap layer 172, TaN seed layer 174, first and second contacts 176 and 178, first and second hard-bias regions 180 and 182, NiFeCr seed layer 184, and GMR spin valve (SV) 186. First half gap layer 172 is formed of a material such as Al$_2$O$_3$, AlSiO$_x$N$_y$, or AlN. TaN seed layer 174 is deposited upon first half gap layer 172. A contact layer is deposited upon TaN seed layer, and a hard-bias film layer is deposited upon the contact layer. Either a lift-off process or an ion milling process is then used on both the contact layer and the hard-bias film layer to remove a central portion of both layers, thereby forming first and second contacts 176 and 178 and first and second hard-bias regions 180 and 182. NiFeCr seed layer 184 is deposited upon first and second hard-bias regions 180 and 182, a portion of first and second contacts 176 and 178, and an exposed central portion of TaN seed layer 174. Each of the layers of GMR spin valve 186 are then deposited on the NiFeCr seed layer 184.

An active portion of GMR spin valve 186 is formed in the central region of the GMR spin valve layers, such that the active portion of GMR spin valve 186 is built up upon a TaN/NiFeCr bilayer seed layer. The configuration of GMR read sensor 170 shown in FIG. 7 allows for first and second hard-bias regions 180 and 182 to be magnetostatically coupled to GMR spin valve 186, thereby providing longitudinal bias for GMR spin valve 186.

Figure 8:
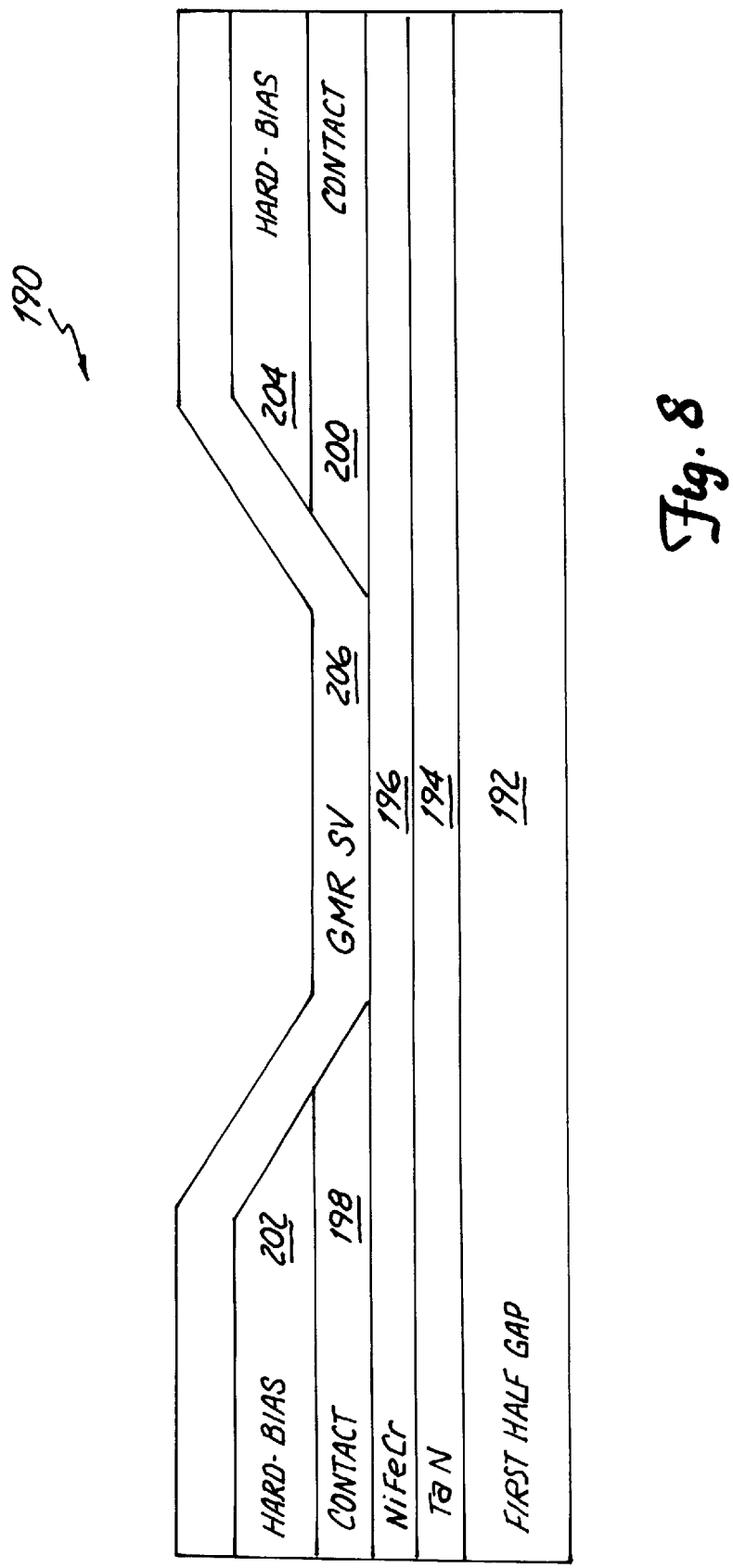
FIG. 8 is a layer diagram of a GMR read sensor in accord with the present invention and having an overlaid structure.

FIG. 8 is a layer diagram of GMR read sensor 190 in accord with the present invention and having an overlaid structure. GMR read sensor 190 includes first half gap layer 192, TaN seed layer 194, NiFeCr seed layer 196, first and second contacts 198 and 200, first and second hard-bias regions 202 and 204, and GMR spin valve (SV) 206. First half gap layer 192 is formed of a material such as Al$_2$O$_3$, AlSiO$_x$N$_y$, or AlN. TaN seed layer 194 is deposited upon first half gap layer 192. NiFeCr seed layer 196 is deposited upon TaN seed layer 194, thereby forming a TaN/NiFeCr bilayer seed layer. A contact layer is deposited upon NiFeCr seed layer 196, and a hard-bias film layer is deposited upon the contact layer. Either a lift-off process or an ion milling process is then used on both the contact layer and the hard-bias film layer to remove a central portion of both layers, thereby forming first and second contacts 198 and 200 and first and second hard-bias regions 202 and 204. Each of the layers of GMR spin valve 206 are deposited upon first and second hard-bias regions 202 and 204, a portion of first and second contacts 198 and 200, and an exposed central portion of NiFeCr seed layer 196.

An active portion of GMR spin valve 206 is formed in the central region of the GMR spin valve layers, such that the active portion of GMR spin valve 206 is built up upon a TaN/NiFeCr bilayer seed layer. The overlay configuration of GMR read sensor 190 shown in FIG. 8 allows for first and second hard-bias regions 202 and 204 to be exchanged coupled to GMR spin valve 206, thereby providing longitudinal bias for GMR spin valve 206.

Figure 9:
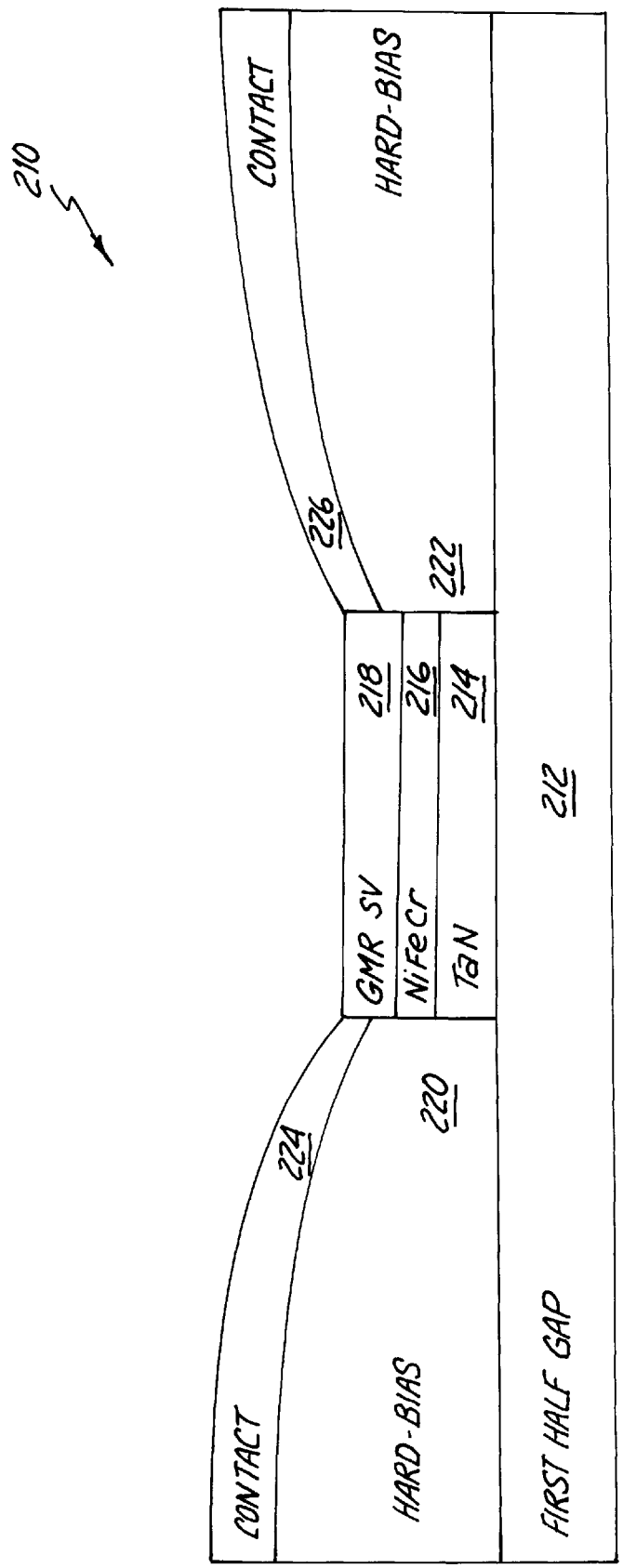
FIG. 9 is a layer diagram of a GMR read sensor in accord with the present invention and having an abutted-junction structure.

FIG. 9 is a layer diagram of GMR read sensor 210 in accord with the present invention and having an abutted-junction structure. GMR read sensor 210 includes first half gap layer 212, TaN seed layer 214, NiFeCr seed layer 216, GMR spin valve (SV) 218, first and second hard-bias regions 220 and 222, and first and second contacts 224 and 226. First half gap layer 221 is formed of a material such as $Al_2O_3$, $AlSiO_xN_y$, or AlN. TaN seed layer 214 is deposited upon first half gap layer 212. NiFeCr seed layer 216 is deposited upon TaN seed layer 214, thereby forming a TaN/NiFeCr bilayer seed layer. Each of the layers of GMR spin valve 218 are built up upon the TaN/NiFeCr bilayer seed layer. Either a lift-off process or an ion milling process is then used on TaN seed layer 214, NiFeCr seed layer 216, and GMR spin valve 218 to leave only a central portion of those layers by removing end portions of those layers. A hard-bias film is then deposited on first half gap layer 212 to form first and second hard-bias regions 220 and 222. A contact layer is then deposited on first and second hard-bias regions 220 and 222 to form first and second contacts 224 and 226. This abutted junction configuration of GMR read sensor 210 shown in FIG. 9 allows for longitudinal biasing of GMR spin valve 218.

In conclusion, a GMR spin valve grown on top of a TaN/NiFeCr bilayer seed layer of the present invention, has an improved overall GMR response over prior art GMR spin valves. This improvement in overall GMR response is due to the TaN/NiFeCr bilayer seed layer better promoting the preferred crystallographic and magnetic orientations in the GMR spin valve than seed layers used in the prior art GMR spin valves. Accordingly, GMR spin valves in accord with the present invention have an improved GMR ratio and an increased exchange pinning field strength.

It is noted that a bilayer seed layer having a first layer formed of tantalum (not tantalum-nitride) and a second layer formed of NiFeCr will also improve the GMR response of a GMR spin valve grown on top of the bilayer seed layer and will increase the strength of the exchange pinning field between a pinning layer and a pinned layer of the GMR spin valve over GMR spin valves of the prior art. However, the overall improvement will not be as great as for a GMR spin valve grown on top of a TaN/NiFeCr bilayer seed layer.

Although the present invention has been described with reference to preferred embodiments, workers skilled in the art will recognize that changes may be made in form and detail without departing from the spirit and scope of the invention.

What is claimed is:

1. A magnetic read head for use in a magnetic data storage and retrieval system, the magnetic read head comprising:
   a giant magnetoresistive spin valve read sensor; and
   seedlayer means for causing the giant magnetoresistive spin valve read sensor to exhibit a giant magnetoresistive ratio of at least eleven percent and an increased exchange pinning field strength.

2. A giant magnetoresistive spin valve read sensor comprising:
   a bilayer seedlayer comprising a TaN seed layer and a NiFeCr seed layer; and
   a stack of films including a free layer adjacent the NiFeCr seed layer, a pinning layer, a pinned layer positioned between the free layer and the pinning layer, and a spacer layer positioned between the free layer and the pinned layer.

3. The giant magnetoresistive spin valve read sensor of claim 2 wherein the atomic percentage of nitrogen in the TaN seed layer is in a range of about 30 to about 70.

4. The giant magnetoresistive spin valve read sensor of claim 2 wherein the atomic percentage of chromium in the NiFeCr seed layer is in a range of about 30 to about 50.

5. The giant magnetoresistive spin valve read sensor of claim 2 wherein a thickness of the TaN seed layer is in a range of about 10 Å to about 200 Å.

6. The giant magnetoresistive spin valve read sensor of claim 2 wherein a thickness of the NiFeCr seed layer is in a range of about 10 Å to about 200 Å.

7. The giant magnetoresistive spin valve read sensor of claim 2 wherein a thickness of the free layer is in a range of about 10 Å to about 500 Å.

8. The giant magnetoresistive spin valve read sensor of claim 2 wherein a thickness of the pinned layer is in a range of about 10 Å to about 100 Å.

9. The giant magnetoresistive spin valve read sensor of claim 2 wherein the free layer is formed of a bilayer comprising a NiFe free layer adjacent the bilayer seed layer and a CoFe free layer adjacent the spacer layer.

10. The giant magnetoresistive spin valve read sensor of claim 2 wherein the pinned layer is formed of a bilayer comprising a NiFe pinned layer adjacent the pinning layer and a CoFe pinned layer adjacent the spacer layer.

11. The giant magnetoresistive spin valve read sensor of claim 2 wherein the pinned layer is formed of a synthetic antiferromagnet.

12. The giant magnetoresistive spin valve read sensor of claim 11 wherein the synthetic antiferromagnet comprises a first and a second CoFe pinned layer and a ruthenium coupling layer positioned between the first and the second CoFe pinned layers.

13. The giant magnetoresistive spin valve read sensor of claim 2 wherein the TaN seed layer has a first and a second end region separated by a central region, the giant magnetoresistive spin valve read sensor further comprising:
   first and second contacts deposited upon the respective first and second end regions of the TaN seed layer; and
   first and second hard-bias regions deposited upon the respective first and second contacts, wherein the NiFeCr seed layer is deposited over the first and second hard-bias regions, portions of the first and second contacts, and the central region of the TaN seed layer.

14. The giant magnetoresistive spin valve read sensor of claim 2 wherein the NiFeCr seed layer has a first and a second end region separated by a central region, the giant magnetoresistive spin valve read sensor further comprising:
   first and second contacts deposited upon the respective first and second end regions of the NiFeCr seed layer; and
   first and second hard-bias regions deposited upon the respective first and second contacts, wherein the stack of films is deposited over the first and second hard-bias regions, portions of the first and second contacts, and the central region of the NiFeCr seed layer.

15. The giant magnetoresistive spin valve read sensor of claim 2 and further comprising a first half-gap layer having a first and a second end region separated by a central region, wherein the TaN seed layer is deposited upon the central region of the first half-gap layer, the giant magnetoresistive spin valve read sensor further comprising:

first and second hard-bias regions deposited upon the respective first and second end regions of the first half-gap layer; and first and second contacts deposited upon the respective first and second hard-bias regions, wherein the first and second contacts and the first and second hard-bias regions are each in contact with the stack of films to form an abutted junction structure.

16. A method for forming a giant magnetoresistive read head for use in a magnetic data storage and retrieval system, the method comprising:

depositing a TaN seed layer, depositing a NiFeCr seedlayer upon the TaN seed layer;

depositing a ferromagnetic free layer upon the NiFeCr seedlayer;

depositing a nonmagnetic spacer layer upon the free layer;

depositing a ferromagnetic pinned layer upon the spacer layer; and depositing an antiferromagnetic pinning layer upon the pinned layer.

17. The method of claim 16 wherein an atomic percentage of nitrogen in the TaN seed layer is in a range of about 30 to about 70, and wherein an atomic percentage of chromium in the NiFeCr seed layer is in a range of about 30 to about 50.

18. The method of claim 16 wherein the step of depositing the free layer upon the NiFeCr seed layer comprises:

depositing a NiFe free layer upon the NiFeCr seed layer; and depositing a CoFe free layer upon the NiFe free layer.

19. The method of claim 16 wherein the step of depositing the pinned layer upon the spacer layer comprises:

depositing a CoFe pinned layer upon the spacer layer; and depositing a NiFe pinned layer upon the CoFe pinned layer.

20. The method of claim 16 wherein the step of depositing the pinned layer upon the spacer layer comprises:

depositing a first CoFe pinned layer upon the spacer layer;

depositing a ruthenium coupling layer upon the first CoFe pinned layer; and depositing a second CoFe pinned layer upon the ruthenium coupling layer.

* * * * *